United States Patent Office 3,483,535
Patented Dec. 9, 1969

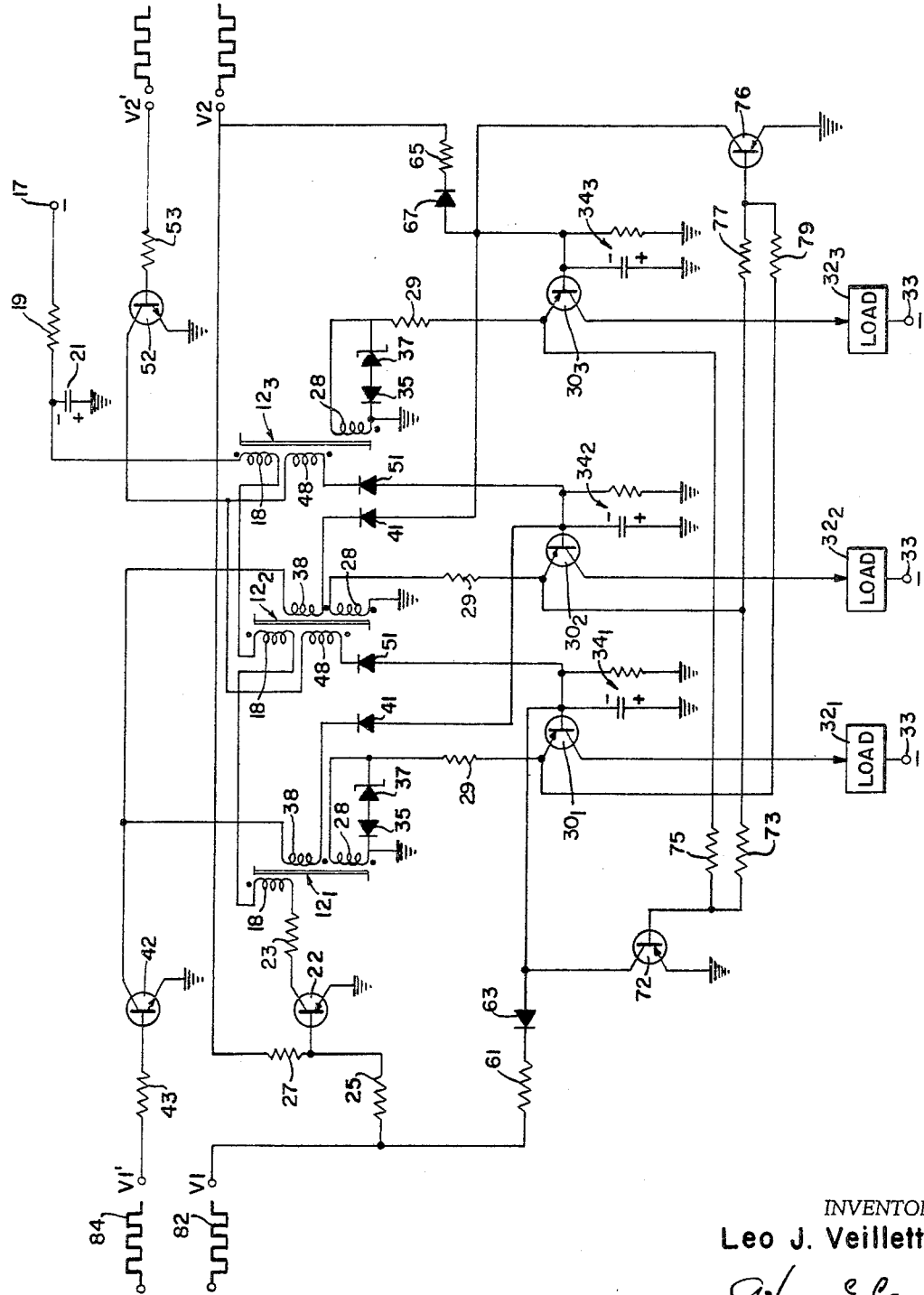

3,483,535
CONTROL APPARATUS FOR APPLYING PULSES OF SELECTIVELY PREDETERMINED DURATION TO A SEQUENCE OF LOADS
Leo J. Veillette, 6836 Nashville Road, Lanham, Md. 20801
Filed July 27, 1966, Ser. No. 568,364
Int. Cl. G11b 5/00; H03k 3/00, 21/00
U.S. Cl. 340—174                    6 Claims

ABSTRACT OF THE DISCLOSURE

Control apparatus including a plurality of gating circuits for sequentially applying a plurality of pulses to a load, whereby each gating circuit is activated by a delay network to apply a pulse for a desired predetermined period. Information indicative of the activation of any gating circuit is stored and a selection circuit, responsive to the stored information and input pulse trains, selectively activates successive gating circuits, in conjunction with associated delay networks, such that the load is pulsed for the predetermined desired period in a selected sequence.

---

The invention described herein was made by an employee of the United States Government and may be manufactured and used by or for the Government for governmental purposes without the payment of any royalties thereon or therefor.

This invention relates generally to control apparatus, and more particularly to control apparatus providing logical operations and pulse shaping in response to a train of input pulses to produce output pulses in a selected sequence for driving slow response-time loads such as phase-pulsed step motors and the like.

There are many instances where it is desirable to pulse a plurality of loads in a desired sequence in response to a single input pulse train. In a typical example these loads may be the armature windings of a phase-pulsed step motor of the type utilized for orientation of the solar paddles of a spacecraft. Other types of stepper motors, stepping switches, relay banks and the like may provide a plurality of loads which are required to be pulsed in a selected sequence in response to a single input pulse train.

The present invention contemplates the provision of a plurality of gating circuits, each operable to supply pulses to a load associated therewith. Each gating circuit is activated by a delay network for a predetermined period. Information indicative of the activation of any gating circuit is stored in a bistable magnetic core. A selection circuit, responsive to the stored information and an input pulse train, selectively activates successive gating circuits, through their associated delay network, such that the loads are pulsed in an ordered sequence in response to the pulse train.

It is accordingly among the objects of the present invention to provide novel and improved control apparatus of the type described that is bi-directional in operation and which draws no stand-by power.

Another object is to provide control apparatus which establishes a desired output pulse sequence in response to an input pulse train, and which is insensitive to extraneous switching transients that produced a false pulse sequence.

A further object of the invention is to provide control apparatus of the type described having simplified circuitry for sequentially pulsing a plurality of loads in the forward or reverse direction, without the loss of pulses, and wherein the load pulses are shaped or stretched as required for use with slow-response loads.

Further objects of the invention will become apparent with reference to the following detailed description of an illustrative embodiment. The various features of the illustrative embodiment may be best understood with reference to the accompanying drawings, wherein:

The figure is an illustrative embodiment of the control apparatus of the invention.

In the figure there is provided a plurality of magnetic cores $12_1$ and $12_2$ and $12_3$, each core being of the type having generally rectangular hysteresis loops for storing digital information in the form of the direction of remnant magnetization. For a given arbitrary direction of remnant magnetization the core is in the "0" state; upon reversal of the direction of remnant magnetization the core is switched to the "1" state. This flux reversal may be achieved by passing a current pulse through a winding placed upon the core. In addition, switching of the flux condition will induce relatively large output signals in any other windings which may be placed upon the core.

For the purposes of the present invention a plurality of stages are utilized, with one core for each stage, interconnected in the manner to be subsequently described. Cores $12_1$ and $12_3$ may be considered in conjunction with the first or the final stage, depending on the direction of operation desired. All other cores may be considered in conjunction with the intermediate stages. For simplicity of illustration a three stage apparatus is shown, with core $12_1$ being in the first stage, core $12_2$ representative of immediate stages and core $12_3$ in the final stage. A larger number of intermediate stages than the one illustrated may be used. All cores may be physically and electrically identical to one another, with the significant difference between the end and the intermediate stages being in the disposition of windings thereon and in certain aspects of the coupling circuitry associated therewith.

Considering the figure further, a first or "reset" winding 18 is provided on each core, and all such windings are connected in series between supply voltage terminal 17 and ground reference through the collector-emitter junction or transistor 22. Resistor 19 and capacitor 21 provide filtering for the voltage supplied to terminal 17, and resistor 23 provides current limiting for the collector-emitter path of transistor 22. The base of transistor 22 is connected, via base resistors 25 and 27, to terminals V1 and V2 respectively. For a negative voltage at terminal 17 transistor 22 is a PNP transistor, and is maintained normally non-conducting. This arrangement provides a single reset line controlled by transistor 22, operable to reset or clear all cores to the "0" state by current pulses through windings 18 when transistor 22 is gated into conduction by pulses applied to either terminal V1 or V2.

A second or "set" winding 28 is also provided on each core $12_1$, $12_2$ and $12_3$. This winding is operable to store information in a given core by switching it from the "0" to the "1" state. One end of each winding 28 is returned to ground reference and the other end thereof coupled to the emitter of individual ones of gating transistors $30_1$, $30_2$ and $30_3$ through current limiting resistors 29. Shunting windings 28 of cores $12_1$ and $12_3$ (the first and final cores), between one side of resistor 29 and ground, is a temperature compensated Zener diode. This may take the form of Zener diodes 35 and diodes 37, connected in back-to-back relationship. Coupled between the base of transistors $30_1$, $30_2$ and $30_3$ and ground reference are resistance-capacitance (RC) networks $34_1$, $34_2$ and $34_3$. Each such RC network includes a resistor and a capacitor connected in parallel. A load $32_1$, $32_2$ and $32_3$ is connected between the collector of each transistor $30_1$, $30_2$ and $30_3$ and a voltage source appearing at terminals 33. For a negative voltage supply transistors $30_1$, $30_2$ and $30_3$ are PNP transistors, and when selected ones are gated or switched to conduction in the manner subsequently described, pulses of an appropriate shape are applied to each load $32_1$, $32_2$ and $32_3$ in a desired sequence. Each load is adopted to utilize pulses provided by a control apparatus of the figure, and typically each may be an armature winding on a phase-pulsed step motor. Alternately, each load may be any suitable utilization device having a slow response time, such as relays, stepping switches, or the like.

The first core $12_1$ and intermediate core $12_2$ (as well as any additional intermediate core that may be used) are each provided with a third or "output" winding 38. This winding transfers a pulse, indicative of stored information, to a successive stage. One end of each winding 38 is connected to the collector of transistor 42 and the other end connected, via decoupling diodes 41, to the top of the appropriate RC network 34 of the next successive stage. In the embodiment shown, diode 41 is poled to pass a negative going pulse to the RC network. Transistor 42, an NPN transistor maintained normally non-conducting, has its emitter returned to ground reference to complete a current return path for winding 38. The base of transistor 42 is coupled to terminal V1' through resistor 43.

Each core except the first core has a fourth or additional "output" winding 48. Thus winding 48 is provided for final core $12_3$, intermediate core $12_2$ and any other intermediate cores. One end of each winding 48 is connected to the collector of transistor 52 and the other end thereof connected, via decoupling diode 51, to the top of the RC network 34 associated with the immediately preceding stage. Diode 51 is poled the same as diode 41, and transistor 52, similar to transistor 42, has its emitter connected to ground reference and its base coupled to terminal V2' through resistor 53.

Terminal V1 is further coupled to RC network $34_1$ (associated with the first tage) by resistor 61 and diode 63. Diode 63 is poled to pass negative going pulses to RC network $34_1$. Similarly, terminal V2 is coupled to RC network $34_3$ (associated with the third stage) through resistor 65 and diode 67.

There is also provided inhibit circuitry for the first and final stages including transistors 72 and 76. The collector-emitter junction of transistor 72 (a PNP transistor) is connected between the top of RC network $34_1$ and ground reference, and its base is connected through resistors 73 and 75 to the emitter of transistors $30_2$ and $30_3$, respectively. The collector-emitter junction of transistor 76 is similarly connected between the top of RC network $34_3$ and ground reference, and its base is connected through resistors 77 and 79 to the emitter of transistors $30_2$ and $30_1$.

In considering the operation of apparatus of the figure, assume that all cores are initially in the "0" state and that it is desired to provide load pulses in the sequence $32_1$, $32_2$ and $32_3$ in response to an input pulse train. For the type of transistors shown, and the diode polarities illustrated, all transistors are normally nonconducting and a negative going pulse train is utilized. Such a pulse train is applied to terminal $V_1$, and simultaneously its inverse (180° phase reversal) is applied to terminal $V_1'$. This inverse may be obtained from a single pulse train by any conventional phase inverting scheme. These two pulse trains are illustrated by waveforms 82 and 84, respectively, in the figure, and is assumed to provide forward operation. It is to be understood that reverse operation, providing load pulse sequence $34_3$, $34_2$ and $34_1$, may be achieved in the same manner as described by applying similar pulse trains to input terminals $V_2$ and $V_2'$.

The first pulse of pulse train 82 is passed by diode 63 to negatively charge the capacitor of RC network $34_1$ and cause transistor $30_1$ to conduct. This first pulse also switches transistor 22 to conduction to supply a current pulse through all series windings 18, thereby driving cores $12_1$, $12_2$ and $12_3$ towards the "0" state. Since these cores are presently in the "0" state the result is to drive them further into saturation and no switching occurs. During this pulse period the reset winding 18 dominates over the set winding 28 and prevents switching of any core from the "0" to the "1" state. At the same time the first pulse of pulse train 84 is applied to the base of transistor 42, but it has no collector voltage and does not conduct. As a result, during the first pulse temporary storage occurs by virtue of the charge build-up across the capacitor of RC network $34_1$. Core $12_1$ does not switch states and transistor $30_1$ conducts. After the end of the first pulse, however, there is no pulse in winding 18 so that set winding 28 is able to switch core $12_1$ to the "1" state. Transistor $30_1$ continues to conduct until the charge stored by RC network $34_1$ is bled off. This results in a pulse across load $32_1$ of greatly extended time duration. The time constant of RC network $34_1$ (typically 36 milliseconds) is such that transistor $30_1$ stops conducting before the next pulse appears at V1. The period of pulse train V1 may be idefinitely long. The direction of current through winding 28 is such that diodes 35 and 37 do not conduct.

The second pulse of pulse train 82 causes transistor 22 to conduct, producing a current pulse through winding 18 to reset core $12_1$ from the "1" to the "0" state. This induces an output pulse in winding 38 of core $12_1$, which pulse is coupled through diode 41 to the top of the RC network $34_2$ to charge its capacitor. The other end of winding 38 is simultaneously brought to ground through transistor 42, which is switched to conduction in response to the second pulse of pulse train 84 applied to its base. The capacitor of RC network $34_2$ is charged rapidly relative to the charging of capacitor of RC network $34_1$ by the second pulse of pulse train 82, with the result that transistor $30_2$ becomes sufficiently conductive to supply base current to switch transistor 72 to conduction. Conduction of transistor 72 effectively clamps the base of transistor $30_1$ to ground and inhibits its conduction. During the pulse period the current through winding 18 of core $12_2$ again dominates to prevent switching of core $12_2$ from the "0" state to the "1" state through the action of winding 28. Transistor $30_2$ conducts in the manner previously described, to produce a pulse of extended length through load $32_2$. Core $12_2$ is switched from the "0" to the "1" state after the end of the pulse.

Operation continues as described through the third or final stage such that loads $32_1$, $32_2$ and $32_3$ are pulsed in the desired sequence. It is to be remembered that after the third pulse core $12_3$ is in the "1" state, all other cores being cleared to the "0" state. On the fourth pulse, a current pulse through winding 18 will switch core $12_3$ from the "1" to the "0" state, inducing a voltage winding 28. However, this induced pulse is of a polarity that causes diodes 35 and 37 to conduct and the energy contained therein is dissiptated by being recirculated through winding 28. There is no induced voltage appearing at the base of transistor 72 to cause it to conduct to inhibit the charging of the capacitor of RC network $34_1$, as occurred with previous pulses. Accordingly, the operation previously described in conjunction with the first pulse of pulse train 82 repeats and a second cycle of controller operation commences.

Application of pulse trains 82 and 84 to terminals V2 and V2' will result in reverse operation; that is, will provide a pulse load sequence of $34_3$, $34_2$, $34_1$. The first pulse of pulse trains 82 and 84 result in operation identical to that previously described except it is RC network $34_3$ rather than RC network $34_1$ that is charged. The second and subsequent pulses result in substantially the same operation, except that when pulse train 82 switches the appropriate core from the "1" to "0" state pulse train 84 causes transistor 52 rather than transistor 42 to conduct, and a pulse is induced in winding 48 rather than winding 38 for application to the appropriate RC networks $34_2$ or $34_1$. With this difference, operation is as described, but in a reverse sequence. This arrangement provides bi-directional operation so that forward or reverse operation may be achieved at any point in the pulse sequence, without the loss of pulses.

The foregoing apparatus provides numerous advantages for controlling the sequential pulsing of slow response loads such as phase-pulsed step motors and the like. The storage provided by the RC networks stretches the load pulses so that slow response loads may be driven while at the same time retaining small magnetic core size. In addition, this storage tends to filter both input and load pulses, and to delay pulsing to eliminate "racing" problems associated with prior art digital feedback techniques. The apparatus draws zero standby power, has simplified input pulse requirements, may be conveniently operated in the forward or reverse direction, provides unidirection in outputs for both directions of operation, and can be easily modified to utilize from two to ten or more stages.

While an illustrative embodiment of the invention has been set forth with partciularity, it should be readily apparent to those skilled in the art that modifications and variations thereof are possible. It is therefore to be understood that the invention may be practiced other than specifically described.

What is claimed as new and desired to be secured by Letters Patent of the United States is:

1. Bi-directional control apparatus for applying pulses to a load, said apparatus comprising a plurality of successive stages interconnected in a chain, each said stage including gating means for applying pulses to an individual load associated therewith and means for storing information indicative of the activation of any one of said gating means; separate delay means including energy storage means connected to each said gating means and adapted to activate individually each said gating means for a desired predetermined period; input means for receiving simultaneously applied pulse trains; and selection means responsive to said stored information and to said simultaneously applied pulse trains and operable to apply pulse energy to the separate delay means of selected stages of said chain; whereby said loads are each pulsed for said desired predetermined period in a selected sequence in response to said pulse trains.

2. The control apparatus of claim 1 wherein said gating means is a switching transistor and said delay means is a resistance-capacitance network, with the emitter-collector junction of said transistor connected in series with said load and with said resistance-capacitance network coupled to the base of said transistor, whereby conduction of said transistor is controlled by the charge across said resistance-capacitance network.

3. The control apparatus of claim 1 wherein said information storing means is a bistable magnetic core operable to store information in the form of the direction of remnant magnetization.

4. The control apparatus of claim 1 and further including inhibit means responsive to said stored information for preventing application of pulse energy to any delay means other than a selected one.

5. Control apparatus for sequentially pulsing a plurality of loads, said apparatus comprising N successive stages each of which includes a bi-stable magnetic core for storing information in the direction of remnant magnetization, each said core having set and reset windings thereon and the cores of the first through N–1 stages having an output winding thereon; individual gating means connected to each said set winding ando perable to apply pulses to a related one of said loads; reset means connected in series with all rest windings for returning all said cores to a common direction of magnetization; delay means connected to each said gating means for storing pulse energy to thereby activate the associated gating means for a desired predetermined period; selection means in circuit with said output windings and the delay means of stages 2 through N and operable to apply pulse energy to said delay means in accordance with information stored in said cores; means for selectively preventing application of pulse energy to the delay means associated with the first stage; and first input means adapted to apply a pulse train to said reset means and to the delay means of the first stage and concurrently to apply the inverse of said pulse train to said selection means; whereby said loads are pulsed in a selected sequence in response to said pulse train.

6. The apparatus of claim 5 and further including an additional output winding on the cores of stages 2 through N, additional selection means in circuit with said additional output windings and the delay means of stages 1 through N–1 and operable to apply pulse energy to said delay means in accordance with the information stored in said cores; further means for preventing application of pulse energy to the delay means associated with the Nth stage; and aditional input means adapted to apply a pulse train to said reset means and to the delay means of the Nth stage and concurrently to apply the inverse of said pulse train to said selection means; whereby said loads are pulsed in the reverse of said selected sequence.

References Cited

UNITED STATES PATENTS

| 3,059,226 | 10/1962 | Einsele | 340—174 |
| 3,063,038 | 11/1962 | Davis | 340—174 |

OTHER REFERENCES

Pulse, Digital and Switching Waveforms, Millman and Taub, 1965, pp. 415–422, 435–437.

STANLEY M. URYNOWICZ, JR., Primary Examiner

KENNETH E. KROSIN, Assistant Examiner

U.S. Cl. X.R.
307—221, 227